United States Patent [19]
Mayo et al.

[11] 3,743,024
[45] July 3, 1973

[54] PLANT HARVESTING MACHINE

[75] Inventors: William Harold Mayo, Cairo, Ga.; Arthur Burnett Winters, Narberth, Pa.; James Bradley Davis, Jr., Cairo, Ga.; Harrison Edenfield, Cairo, Ga.; Aubrey Cornelius Gainous, Cairo, Ga.

[73] Assignee: Campbell Soup Company, Camden, N.J.

[22] Filed: Mar. 19, 1971

[21] Appl. No.: 125,945

[52] U.S. Cl. ................................................ 171/61
[51] Int. Cl. .......................................... A01d 19/12
[58] Field of Search ................................ 161/61, 62

[56] References Cited
UNITED STATES PATENTS

| | | | |
|---|---|---|---|
| 2,855,058 | 10/1958 | Krier et al. | 171/61 |
| 1,657,183 | 1/1928 | Siemann | 171/61 |
| 3,262,503 | 7/1966 | Zijistra et al. | 171/61 |
| 2,368,895 | 2/1945 | Spiegl | 171/61 |
| 3,543,493 | 4/1967 | Duda | 171/61 |
| 3,578,088 | 5/1971 | Raath | 171/62 |
| 2,902,997 | 9/1959 | Hawkins et al. | 171/61 |

*Primary Examiner*—Antonio F. Guida
*Attorney*—John W. Logan

[57] ABSTRACT

A harvesting machine for the automatic harvesting of seedling plants. The machine includes means for loosening the soil adjacent the plant roots and for cutting the roots at a predetermined depth. Conveyors aligned with each row of plants and driven at a speed commensurate with the forward speed of the machine lift the plants from the loosened soil. Rotary beaters having resilient vanes engage the roots of the plants as they pass along the conveyors to remove any soil clinging to the roots. The machine includes means for advancing the plants directly into shipping cartons from the conveyors.

23 Claims, 14 Drawing Figures

FIG. 2

INVENTORS
WILLIAM H. MAYO
ARTHUR B. WINTERS
JAMES B. DAVIS, JR.
HARRISON EDENFIELD
AUBREY C. GAINOUS
BY Howson & Howson
ATTYS.

INVENTORS:
WILLIAM H. MAYO
ARTHUR B. WINTERS
JAMES B. DAVIS, JR.
HARRISON EDENFIELD
AUBREY C. GAINOUS
BY
Howson & Howson
ATTYS.

PLANT HARVESTING MACHINE

The present invention relates generally to mechanized farm equipment and relates more particularly to a machine for automatically harvesting seedling plants such as tomato plants.

Although it will be apparent that the present machine may be employed for harvesting a variety of agricultural products, the machine was developed for and will be described in the context of the harvesting of tomato plant seedlings. Tomato plants, for commercial use, are traditionally grown from seed in southern climates until the plants have reached a sufficiently mature size and hardiness to enable their transplant. The plants after harvesting are shipped to northern regions where they are replanted for fruit production.

Prior to the present invention, the plants have been manually harvested. Because of the very short, seasonal nature of the harvesting operation, however, it has been difficult to recruit the needed number of laborers. Furthermore, manual harvesting costs have in recent years advanced rapidly due to an inflated economy.

The present invention provides a machine which is adapted to automatically perform all of the functions heretofore carried out manually in the harvesting of seedling tomato plants. In brief, the machine includes means for loosening the soil around the roots of the plants and for cutting the plant roots at a predetermined depth. Conveyors are provided for gripping the stem portions of the plants and lifting the plants from the ground. Rotary beaters having resilient vanes knock the residual soil from the plant roots as the plants pass along the conveyor. The plants are advanced by the conveyor directly into shipping cartons adapted to fit over the conveyor ends. Means are further provided to accumulate plants adjacent the conveyor ends during changing of the cartons.

It is accordingly a first object of the present invention to provide a machine for automatically harvesting seedling plants.

A further object of the invention is to provide a machine as described which is adapted to loosen the earth around the plant roots and cut the plant roots at a predetermined depth prior to removal of the plants from the soil.

Another object of the invention is to provide a machine as described which will remove residual soil from the plant roots following removal of the plants from the ground.

A still further object of the invention is to provide a machine as described which will advance the plants directly into shipping cartons in an upright parallel relation.

An additional object of the invention is to provide a machine as described which includes means for accumulating conveyed plants in an upright, parallel disposition during the changing of the shipping cartons.

Additional objects and advantages of the invention will be more readily apparent from the following detailed description of an embodiment thereof when taken together with the accompanying drawings wherein:

Figure 1:
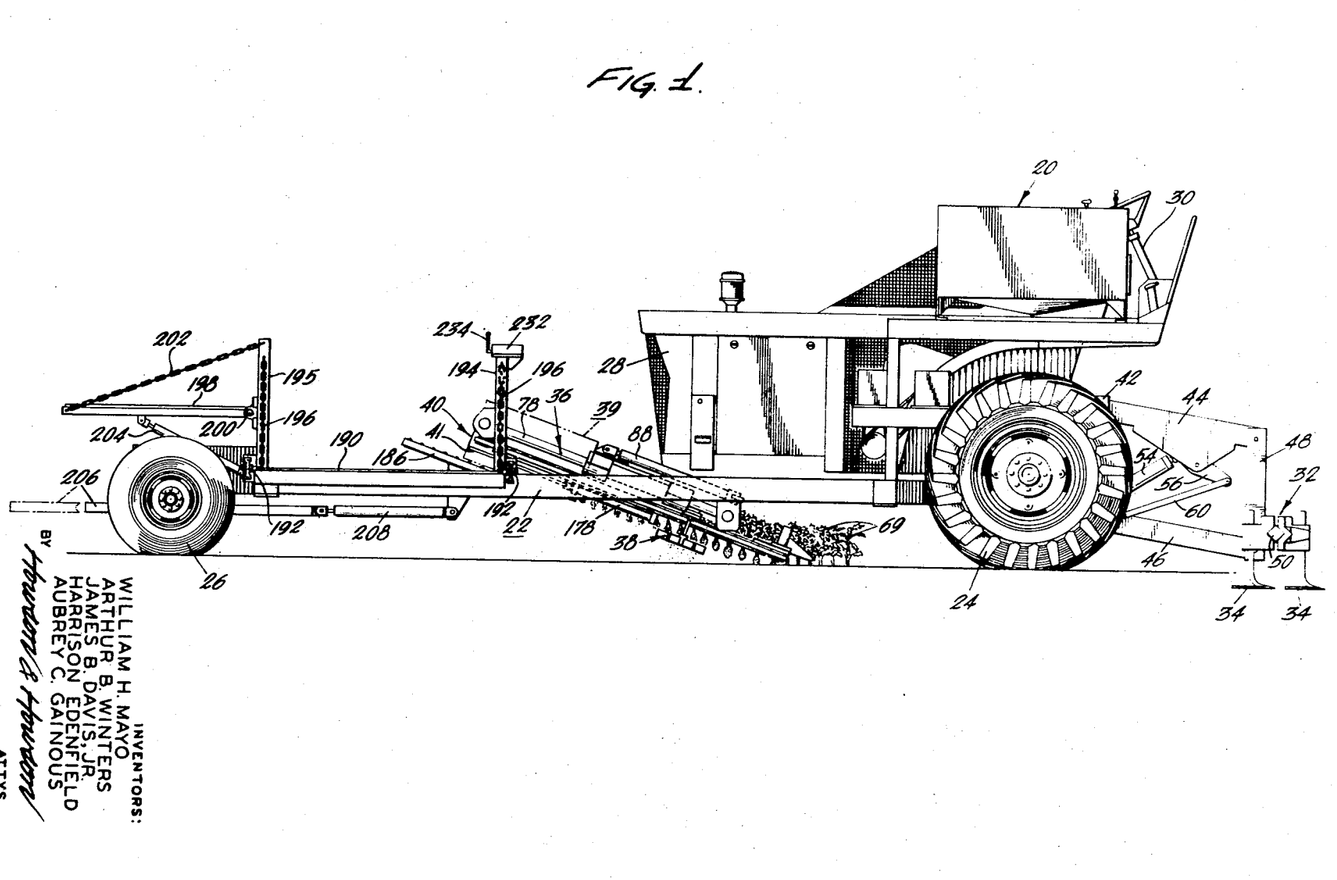
FIG. 1 is a side elevational view of a plant harvesting machine in accordance with the present invention.

Referring to the drawings and specifically to FIG. 1 thereof, the embodiment illustrated comprises a self-propelled vehicle generally designated 20 which includes a substantially rectangular frame assembly 22 which is supported in spaced parallel relation to the ground by the front and rear wheel and axle assemblies 24 and 26. The vehicle 20 is powered by an enclosed internal combustion engine 28 which transmits power to the front axle and wheel assembly 24 through a hydrostatic transmission. The vehicle is driven from an operator's station 30 located over the left front wheel and is steered by means of a hydraulic linkage which turns the rear wheels 26.

The vehicle as described thus far is not of itself novel and is in fact a commercially available unit manufactured by the New Idea Farm Equipment Company, Coldwater, Ohio, as the model 701 Power Pack Unit. It will be apparent from the following description of the invention that the elements of the invention may be carried on any type of vehicle whether self-propelled or tractor drawn. Although the self-propelled rubber tired vehicle is preferred because of its maneuverability and simplicity, it will be apparent that a wide variety of vehicles could be employed including crawler type vehicles.

Figures 4, 6:
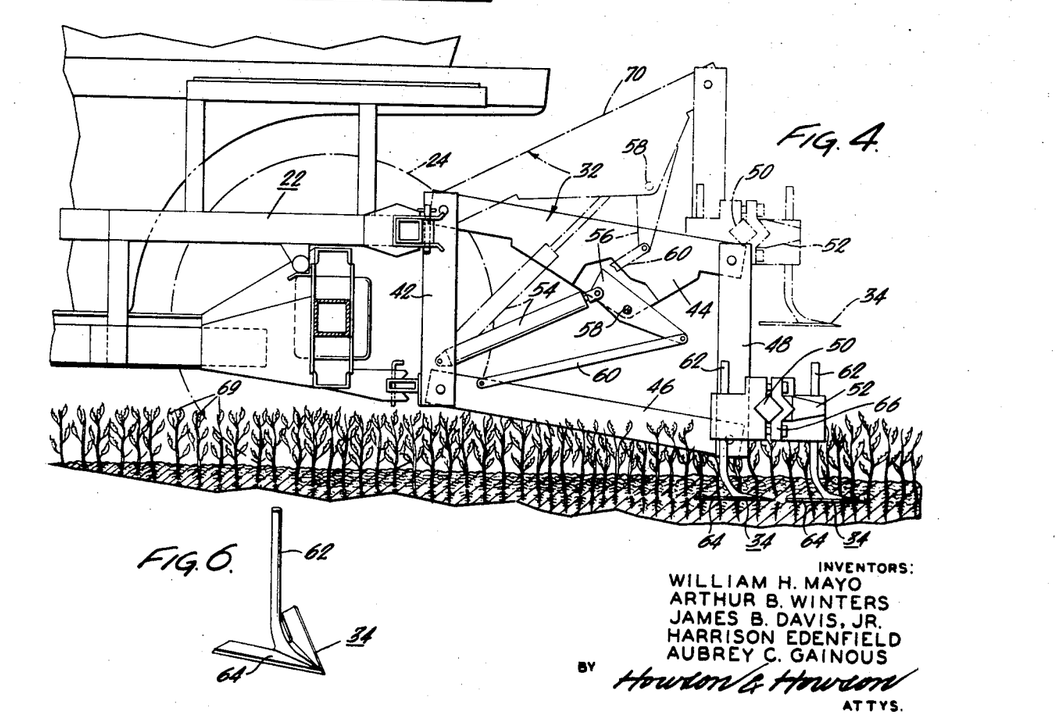
FIG. 4 is an enlarged side elevational view of the front portion of the machine of FIGS. 1 and 2 showing the soil breaking and root cutting mechanism in operation, and, in broken lines, in the raised inoperative position.
FIG. 6 is a perspective view of one of the soil breaking elements of the apparatus shown in FIGS. 4 and 5.

Considering broadly the operating units of the invention, a soil loosening and root cutting unit generally designated 32 is located forwardly of the front wheels for the purpose of directing a plurality of spear-like tool elements 34 along the rows of plants to loosen the earth around the plant roots and to cut the roots at a predetermined depth as shown for example in FIG. 4. Located rearwardly of the front wheels of the vehicle and adjustably mounted on the vehicle frame 22 are a plurality of plant conveyor assemblies generally designated 36, each of which is adapted to successively grasp the plants of a given row and to lift the plants from the ground and convey them rearwardly toward a carton packing station 40. Beaters generally designated 38 are provided beneath the conveyor assemblies 36 for removing soil from the plant roots. The plants are advanced by the conveyor assemblies 36 into packing cartons 39 disposed at the discharge end of the conveyor assemblies at the carton packing station. An accumulator 41 is provided at the conveyor discharge ends to accumulate the plants during the substitution of an empty carton for a filled carton. The filled cartons are manually transferred to a trailer (not shown) drawn behind the harvesting machine.

Figure 5:
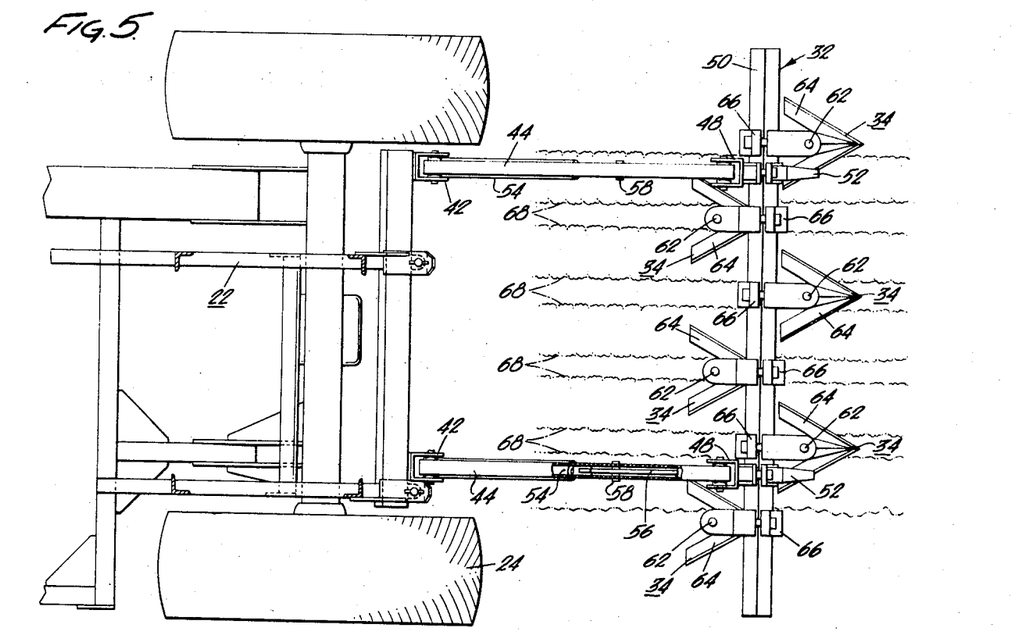
FIG. 5 is a plan view of the mechanism shown in FIG. 4.

With the above general description of the machine and its functions in mind, the various portions of the machine can be considered in detail. Considering first the earth loosening and root cutting assembly 32, with reference to FIGS. 4 and 5 it will be observed that this assembly is supported on parallel vertical channel members 42 which are secured to the framing elements making up the frame assembly 22 of the vehicle. Upper and lower support arms 44 and 46 pivotally attached to each of the frame members 42 extend forwardly and are held in pivotal parallel relation by the vertical member 48 which forms a parallogram linkage. A horizontally disposed tool bar 50 is secured toward the lower ends of the members 48 by means of bolted bracket assemblies 52. The tool bar 50 may be selectively raised or lowered by means of hydraulic cylinders 54, each of which is pivotally connected at one end to one of the vertical supports 42 and at the other end to a lever 56 which is pivotally mounted at 58 to an upper support arm 44. A connecting link 60 pivotally joins each lower arm 46 and the lower end of the lever 56 completes the hydraulic cylinder linkage. Extending below the tool bar 50 at spaced intervals are the soil loosening and root cutting elements 34 which are shown most clearly in FIG. 6. The elements 34 are characterized by a vertical stem portion 62 and a horizontal V-shaped portion 64 affixed to the lower end thereof. The elements 34 are secured at spaced intervals to the tool bar 50 by means of the adjustable tool holder brackets 66. The brackets permit the spacing of the elements 34 on the tool bar 50 in such a manner as to position the stem portions 62 of the elements between the rows 68 of plants 69 as illustrated in FIG. 5 when the conveyor assemblies 36 are aligned with the plant rows. As shown in FIG. 4, the elements 34 may be raised substantially above the ground by elevation of the assembly 32 to the position 70 shown in broken lines for movement of the machine to and from the fields being worked.

Figure 2:
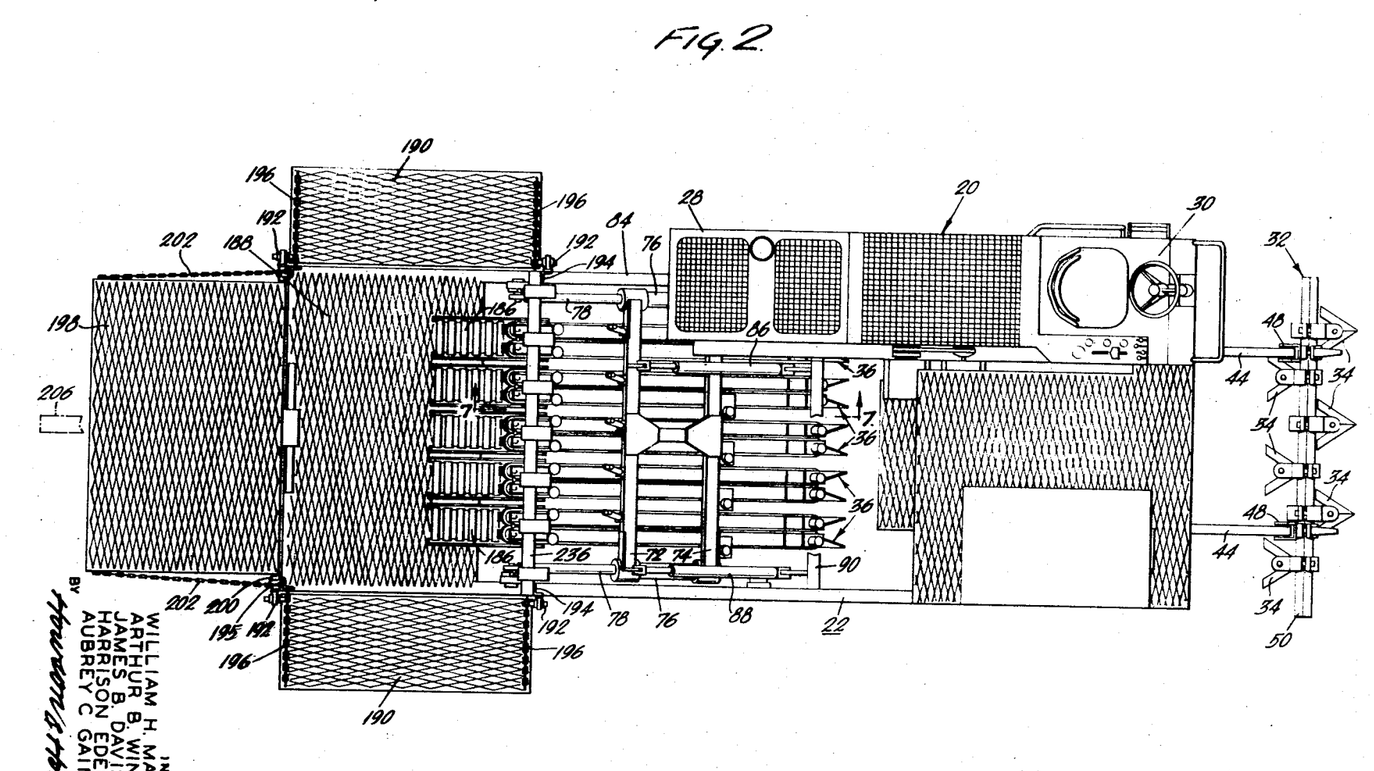
FIG. 2 is a plan view of the machine illustrated in FIG. 1.

As shown in FIG. 2, in the present machine there are five parallel closely spaced conveyor assemblies 36 each of substantially identical construction which are spaced the same distance apart as the plant rows 68. Each of the conveyor assemblies is supported beneath the pair of transverse support members 72 and 74 which at each side of the frame assembly 22 are in turn slidably supported by the linear bearing members 76 on the inclined support rods 78. The rods 78 are attached respectively at their forward and rear ends to the support assemblies 80 and 82 extending from the side rails 84 of the frame assembly 22.

The conveyor assemblies are moved along the support rods 78 by means of the hydraulic cylinders 86 and 88, each of which is attached at its forward end to a transverse frame member 90 and at the opposite end to the support members 72. By actuation of the cylinders 86 and 88, the entire group of conveyor assemblies may be selectively moved toward or away from the ground. Although the cylinder 88 is mounted directly over one of the inclined support rods 78, it will be noted that the cylinder 86 in the present embodiment is located inwardly of the corresponding support rod due to the presence of the engine 28 and its housing on that side of the machine.

Figure 3:
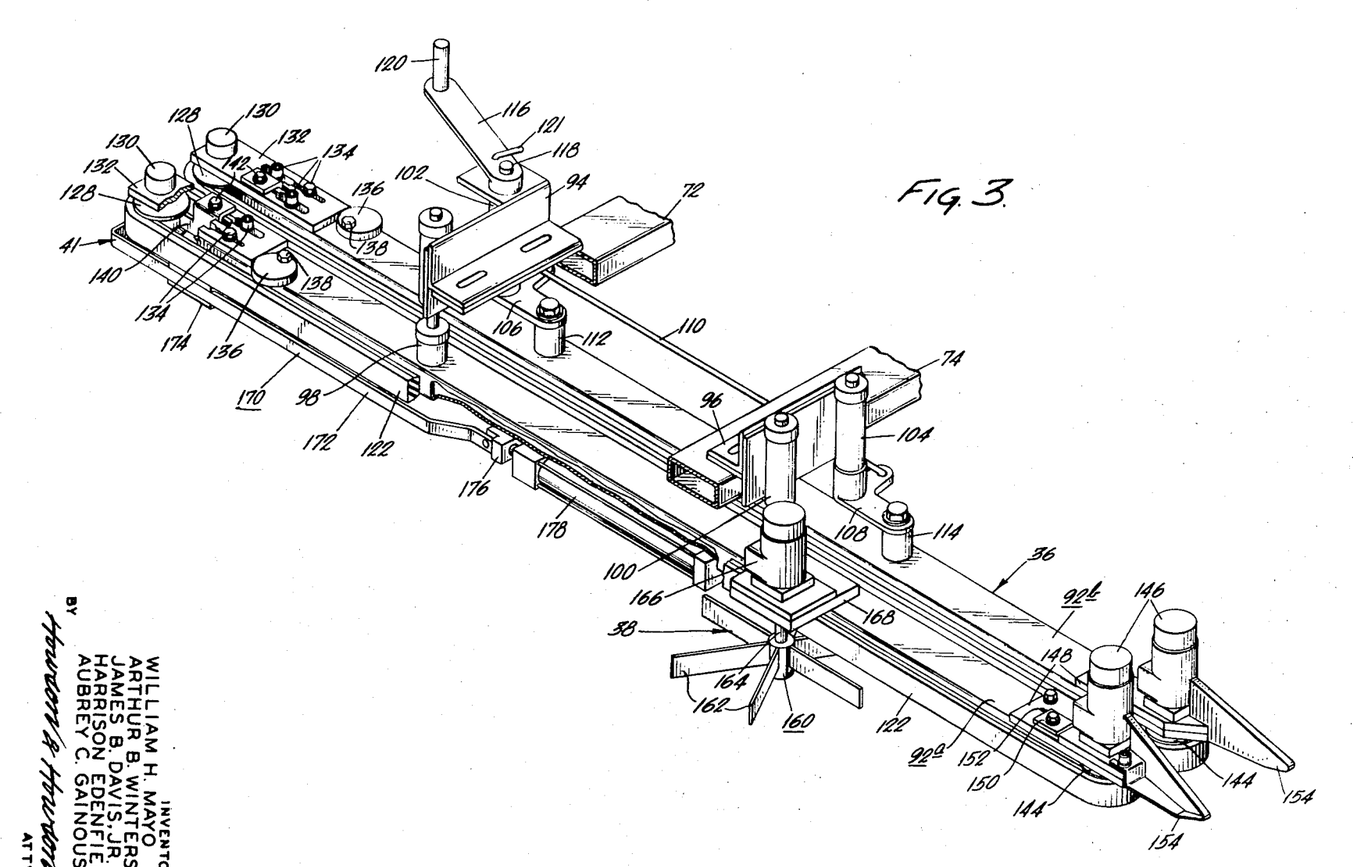
FIG. 3 is a perspective enlarged view partly in section and partly broken away of one of the plant conveyor assemblies of the machine illustrated in FIGS. 1 and 2.
Figure 10:
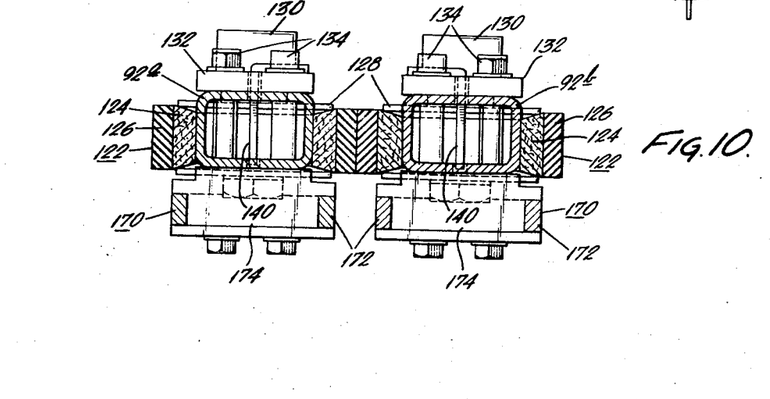
FIG. 10 is an enlarged sectional view taken along line 10—10 of FIG. 7 showing details of the plant conveyor assemblies.

The construction of each of the conveyor assemblies 36 is shown most clearly in FIG. 3. Each conveyor assembly includes a pair of conveyor frame members 92a and 92b which as shown in FIG. 10 are preferably hollow and of a substantially rectangular cross-section. The conveyor frame members are respectively supported beneath support members 72 and 74 by brackets 94 and 96 which are bolted to the support members. The conveyor frame member 92a is suspended beneath the brackets by support assemblies 98 and 100 respectively secured to the brackets 94 and 96. The conveyor frame member 92b is adjustably disposed beneath the brackets 94 and 96 by means of a linkage which allows the member 92b to be swung away from the member 92a in a parallel fashion for a purpose described herebelow.

The mechanism permitting the parallel movement of the conveyor frame member 92b includes the support assemblies 102 and 104 mounted on the brackets 94 and 96 which at their respective lower ends rotatably support the bell cranks 106 and 108. A tie rod 110 connects the bell cranks to insure a constant angular relation of the cranks. The bell cranks are at their forward end linked to the conveyor frame member 92b by the connector assemblies 112 and 114. A crank 116 is provided at the upper end of the support assembly 102 which is connected to a vertical shaft 118 secured at its lower end to the bell crank 106. The rotation of the crank 116 by means of handle 120 will accordingly rotate the bell crank 106 and, through the action of tie rod 110, the bell crank 108 in parallel relation thereto, thereby causing the frame 92b to move in a parallel fashion away from the frame member 92a. A locking pin 121 passing through the crank 116 and an underlying plate locks the crank and hence the conveyor frame members in the normal operating position illustrated.

A plant conveyor belt 122 is disposed circumferentially around each of the frame members 92a and 92b. Each belt comprises a strong, resilient inner layer 124, and a soft, sponge rubber outer layer 126. The inner layer 124 may be reinforced with fabric or other material. The conveyor belts of each conveyor assembly are as shown in FIG. 10 in contact along their juxtaposed faces in the absence of plants passing through the assembly.

Means for supporting and driving the conveyor belts 122 includes a flanged sheave 128 at the back end of each of the conveyor frame members which is journaled in bearing assembly 130 supported on belt tension adjustment plate 132. The plate 132 is adjustably positioned on the upper surface of each conveyor frame member by bolts 134 disposed in slots in the plate 132. A cam 136 having a bolt 138 secured thereto is pivotally mounted on each conveyor frame member 92a and 92b adjacent the forward edge of each plate 132 for the purpose of adjusting the tension of the conveyor belts. This is accomplished by means of a wrench, preferably a torque wrench, on the bolt 138 which when rotated turns the cam 136 and exerts a belt tensioning force on the plate 132. When the correct belt tension is produced, the bolts 134 are tightened. A scraper 140 is secured by bolt 142 adjacent each sheave 128 to clean the groove of the sheave and prevent the buildup of dirt between the conveyor belt and sheave.

Figure 8:
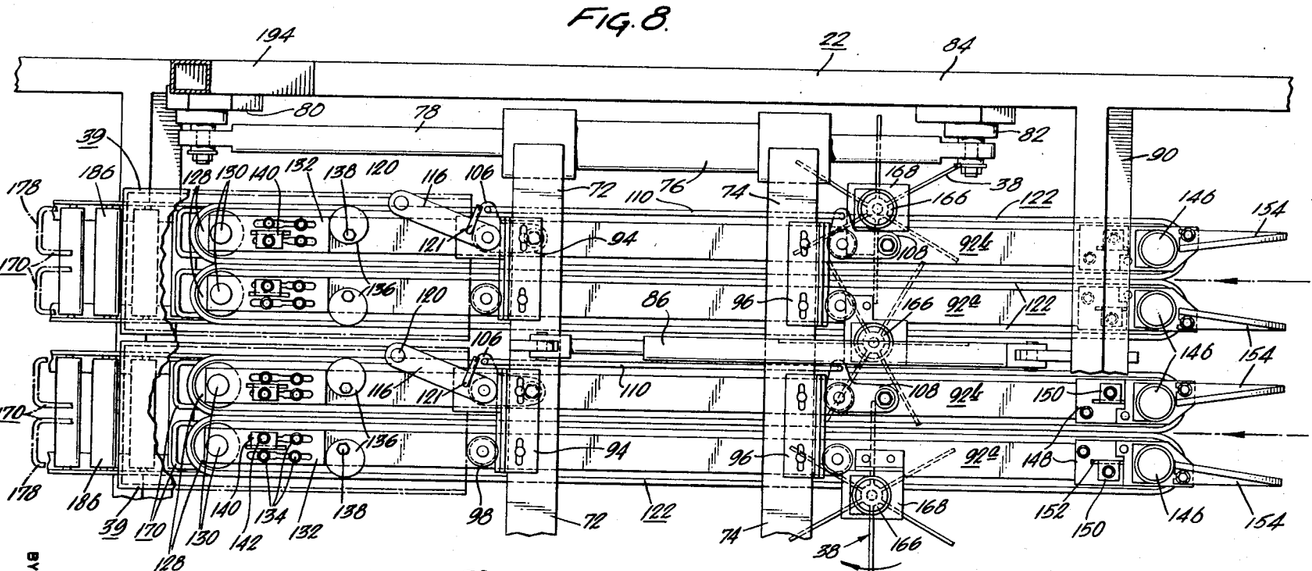
FIG. 8 is a partial view of two of the plant conveyor assemblies taken along line 8—8 of FIG. 7.

At the forward ends of the frame members 92a and 92b, the conveyor belts pass around flanged drive sheaves 144 similar to the sheaves 128, the sheaves 144 being driven in rotation by hydraulic motors 146. The motors 146 are mounted above the forward ends of the conveyor frame members on support plates 148 which are bolted to the upper surface of the conveyor frame members. A scraper 150 extends through a slot 152 in each of the support plates 148 to prevent dirt buildup on the sheaves 144. Extending forwardly of each conveyor assembly are the plant guides 154 which as shown in FIG. 8 are angled slightly outwardly to guide the plants into the nip of the conveyor belts.

Figure 13:
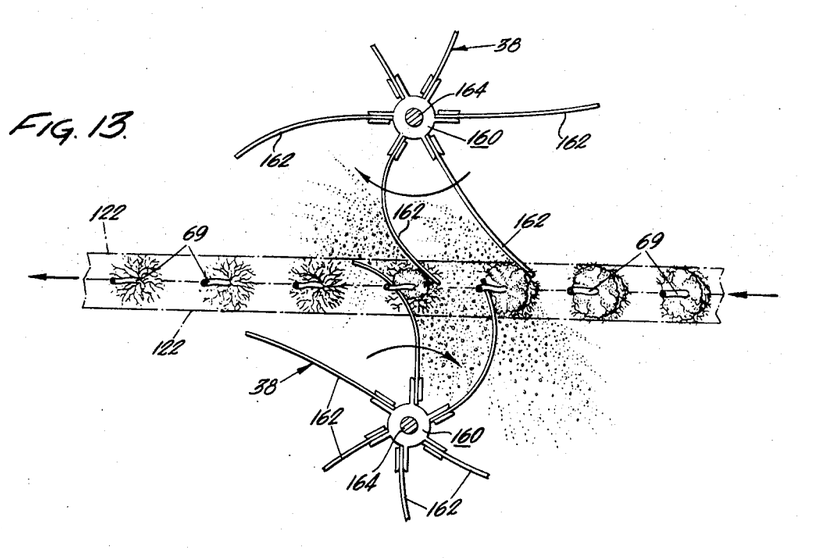
FIG. 13 is a view taken along line 13—13 of FIG. 12 further illustrating the removal of soil from the plant roots.

Associated with the conveyor assemblies 36 as indicated above are the beaters 38 for removing soil from the plant roots as the plants pass along the conveyor assemblies. The beaters 38 comprise a plurality of rotating wheels 160 having a plurality of flexible elongated vanes 162. Each wheel 160 is mounted on a shaft 164 perpendicular to the conveyor assembly frame members so that the vanes 162 may pass through the zone through which the roots of the plants are conveyed. As shown in FIG. 13, the beaters 38 are disposed with the vanes 162 thereof overlapping the vanes of the adjacent beater. Each shaft 164 is supported and driven by a hydraulic motor 166 carried by the support plate assembly 168 attached to the upper surface of the adjacent conveyor frame member. As illustrated in FIG. 13, the wheels 160 are all rotated in a clockwise direction as viewed from above with the result that the vanes contact the roots from opposite sides in opposite directions. The flexibility of the vanes permits the necessary deformation and earth removing action without damaging the roots. With the five conveyor assemblies illustrated, a total of six beaters are utilized in the present embodiment, there being one between each conveyor assembly and one positioned at each side of the combined assemblies.

Figures 7, 9, 11:
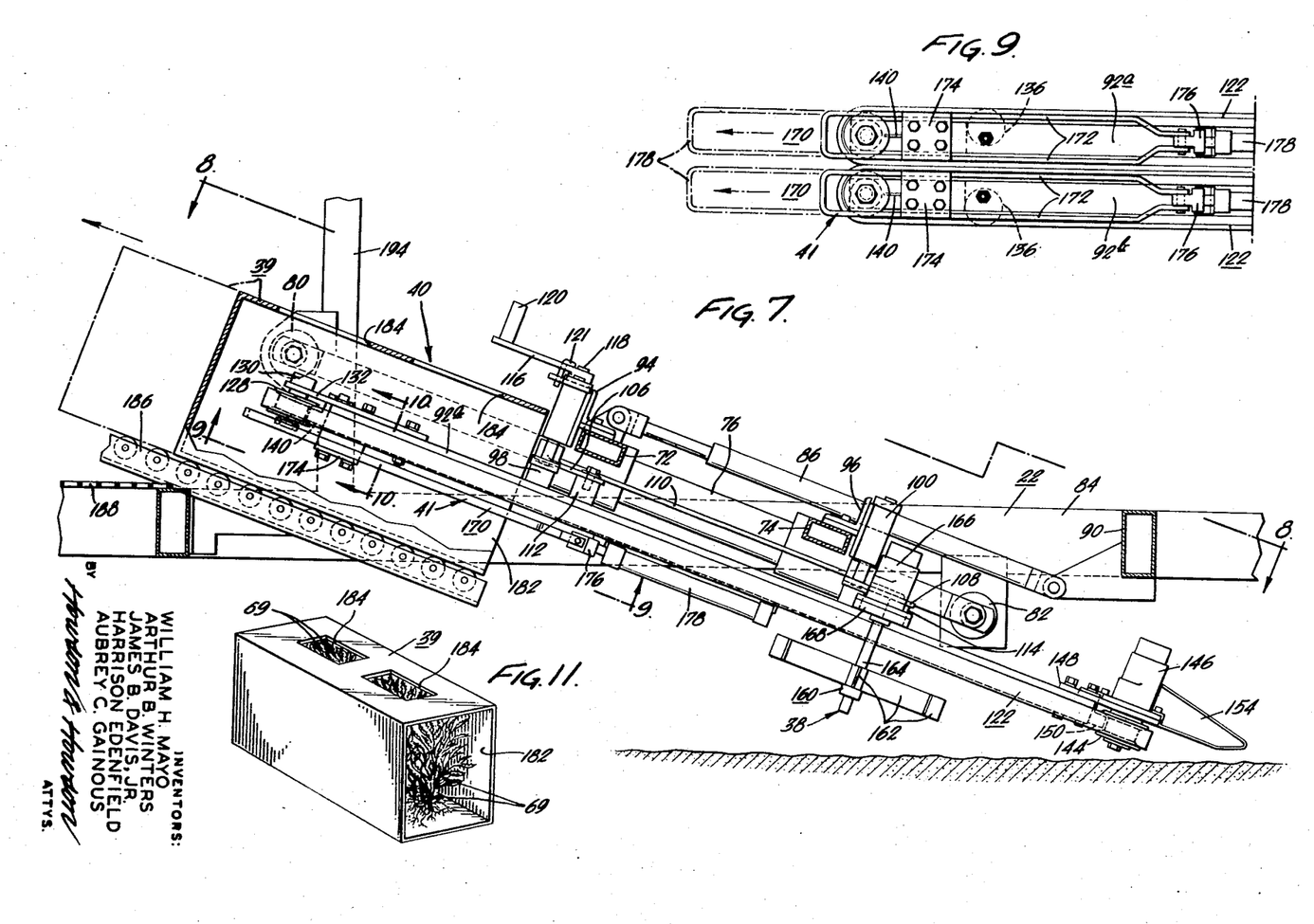
FIG. 7 is an enlarged view partly in section taken along line 7—7 of FIG. 2.
FIG. 9 is a view taken along line 9—9 of FIG. 7 showing details of one of the accumulator assemblies.
FIG. 11 is a perspective view showing a shipping carton filled with plants by the present machine.

The accumulator assembly 41 provided at the discharge end of each of the conveyor assemblies 36 includes as shown most clearly in FIG. 9 a loop-shaped accumulator bar 170 slidably disposed beneath each of the conveyor frame members 92a and 92b. Each of the bars 170 includes parallel side portions 172 which are slidably supported by the guide assembly 174 bolted beneath the conveyor frame member. The forward end of each of the accumulator bars 170 is attached by a suitable connector 176 to a hydraulic cylinder 178 fastened beneath the conveyor frame member. Upon actuation of the cylinder, the accumulator bar is moved rearwardly to the position 178 illustrated in broken lines in FIG. 9. When the adjacent accumulator bars 170 of a conveyor assembly are in the extended position 178, plants passing from the cooperating conveyor belts are accumulated between the accumulator bars while the shipping carton is replaced. When the accumulator bars are returned to their original position, the plants accumulated therebetween are dropped into the carton in the proper disposition.

The cartons 39 as shown in FIG. 11 each comprise a generally rectangular box having an open end 182 and inspection ports 184 in the top thereof. The cartons are of a size sufficient to hold the plants in an upright row without unduly confining the branches and roots. The cartons are manually positioned over the ends of each of the conveyor assemblies 36 in the packing station 40. For this purpose, a roll conveyor 186 is provided as shown in FIGS. 2 and 7 beneath and extending rearwardly of each of the conveyor assemblies and inclined at the same angle as the conveyor assemblies. The cartons are positioned over the ends of the conveyor assemblies until the forward edges thereof engage the conveyor frame support elements 98 and 102 as shown in FIG. 7.

The machine operators other than the driver stand on an expanded metal platform 188 at the rear of the conveyors which is supported by the frame assembly 22. Side platforms 190 at each side of the platform 188 are foldably attached by hinge means 192 to the frame assembly 22 and may be swung from the horizontal position illustrated to a vertical position to minimize the width of the machine when not in harvesting use. Forward and rear vertical support posts 194 and 195 secured to the frame assembly 22 adjacent the hinge means 192 support the side platforms 190 in their horizontal position by means of chains 196 extending from the upper portion of the support posts at each end of the side platform members.

A rear platform 198 is pivotally connected by hinge means 200 to the rear support posts 195 and includes supporting chains 202 extending from the support posts. A hydraulic cylinder 204 is provided to permit adjustment of the height of the rear edge of the rear platform 198 to a convenient level for transfer of cartons to and from the following trailer. A trailer draw bar 206 is connected to a hydraulic cylinder 208 attached to the frame assembly 22 and thus may be selectively extended or drawn toward the machine to position the trailer at the most convenient distance for the transfer of the cartons.

Figure 14:
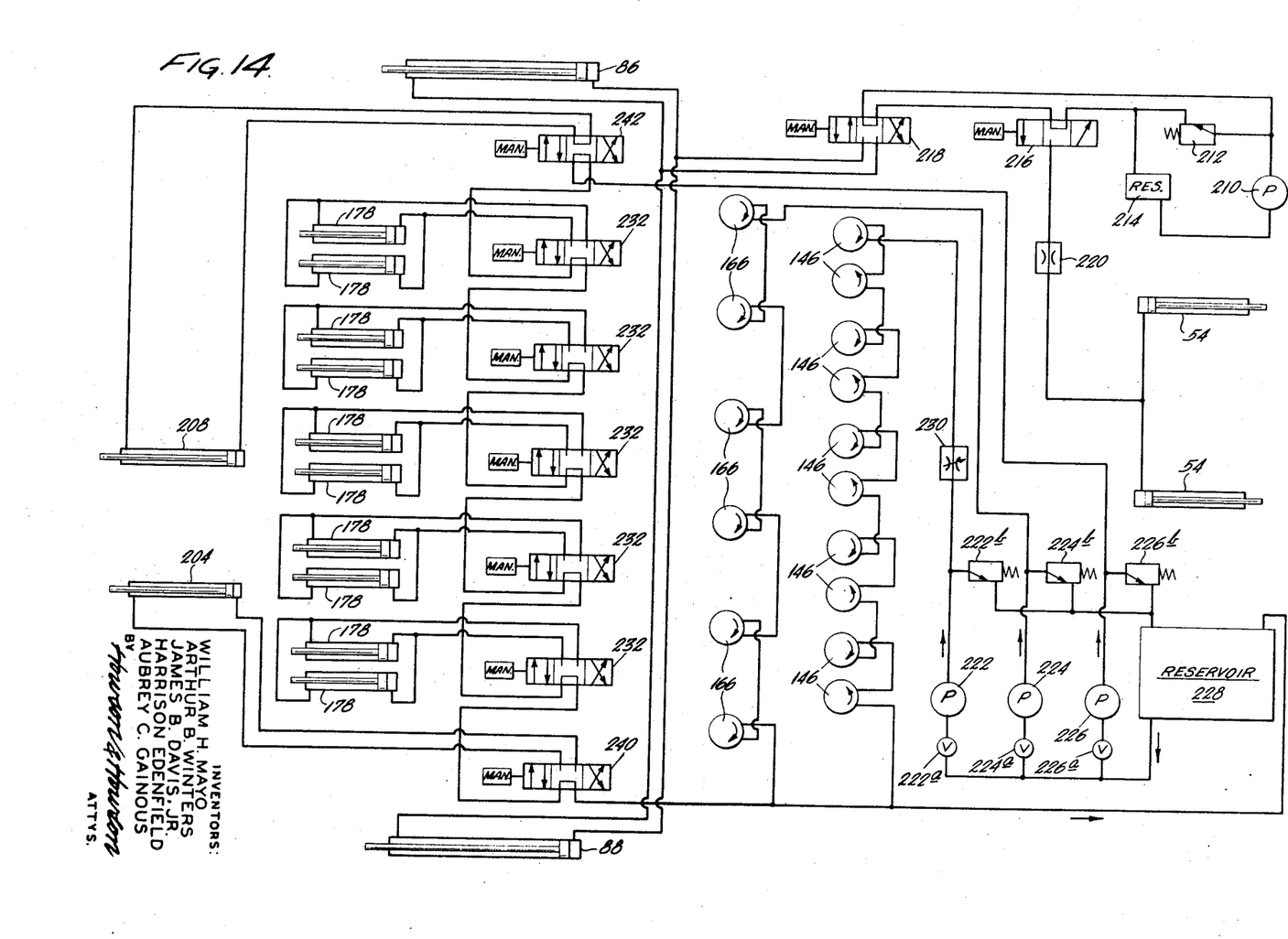
FIG. 14 is a schematic diagram of the hydraulic circuits of the present machine.

Referring to FIG. 14, the hydraulic circuitry of the machine is schematically illustrated and includes essentially two separate hydraulic systems. A first low capacity system includes a pump 210, pressure regulating valve 212 and reservoir 214. The tool bar cylinders 54 and the conveyor assembly cylinders 86 and 88 are as indicated respectively connected with the pump 210 and actuated by means of the three-way manually controlled spool valves 216 and 218. A flow restricting orifice 220 controls the rate of movement of the cylinders 54 which it will be noted are hydraulically driven only in the upward direction, the weight of the tool bar unit providing a downward return upon the setting of the valve 216 to the drain position. The pump 210, valve 212, and reservoir 214 are located within the enclosed mechanism at the forward part of the machine and are not specifically shown in the drawings. The control valves 216 and 218 are manually controlled from the operator's station 30 and normally require only an initial setting for harvesting a given crop of plants. The settings may of course be changed during the harvesting operation if for any reason a different setting is necessary.

The second hydraulic circuit is characterized by three pumps 222, 224 and 226 each of which draws fluid from a reservoir 228 through control valves 222a, 224a and 226a. The pressure of the fluid delivered by the three pumps is controlled by the pressure regulating valves 222b, 224b and 226b. The fluid from pump 222 passes in series through the hydraulic motors 146 which drive all of the conveyor belts at a uniform speed. This speed may be selectively varied by means of the variable orifice valve 230.

The pump 224 supplies pressurized fluid to the hydraulic beater motors 166 which are connected thereto in series. The beaters are rotated at a constant speed to provide a movement of the resilient vanes 162 across the plants which is approximately four times the speed of the conveyor belt travel.

The pump 226 supplies hydraulic power to the accumulator cylinders 178, the rear platform cylinder 204, and the trailer hitch cylinder 208. The accumulator cylinders are selectively actuated in pairs by means of the manually operated three-way valves 232, the control handles 234 of which as shown in FIGS. 1 and 2, are positioned immediately above the end of the controlled accumulator on a transverse member 236 extending between the forward support posts 194. The accumulator assembly of each conveyor assembly may thus be independently operated as described below.

The rear platform cylinder 204 is connected with the pump 226 by means of a manually operated three-way valve 240. Similarly, the circuit connecting the trailer hitch cylinder 208 with the pump 226 includes a three-way manually operated valve 242. The controls for valves 240 and 242 are located in the operator's station 30 for operation by the machine driver.

For operation of the machine, the vehicle is driven to the field of plants to be harvested and is aligned with the rows of plants 68 so that the stem portions 62 of the elements 34 of the earth loosening and root cutting assembly 32 will pass between the rows of plants. With the machine in this position, the conveyor assemblies 36 will also be aligned so that the plant guides 154 of each conveyor assembly pass to the opposite sides of a row of plants, thus guiding the plants into the nip of the conveyor belts. With the machine moving forward, the assembly 32 is lowered to the desired height by means of the valve 216. Once the depth of cut of the elements 34 has been established, the assembly 32 should not require adjustment under normal conditions. The conveyor assemblies are similarly adjusted with respect to the ground by means of the control valve 218 which by actuating cylinders 86 and 88 allows the assemblies as a unit to be angularly advanced or withdrawn along the support rods 78. It is normally desired to grip the plant stems as close as possible to the ground and adjustment may occasionally be required to insure a close proximity of the conveyor to the ground over which the machine is passing.

A trailer bearing empty cartons is connected with the draw bar 206 and is drawn in close to the vehicle by actuation of the valve 242 controlling the cylinder 208. The rear platform 198 is adjusted in height by means of the valve 240 controlling cylinder 204 to accord with the height of the trailer. The side platforms 190 are arranged in the horizontal position illustrated in the drawings and several workers are stationed on the platform 188 for the purpose of supplying empty cartons to the conveyor assemblies, removing filled cartons, and for freeing the conveyor assembly should rocks or other foreign materials jam the conveyors.

Figure 12:
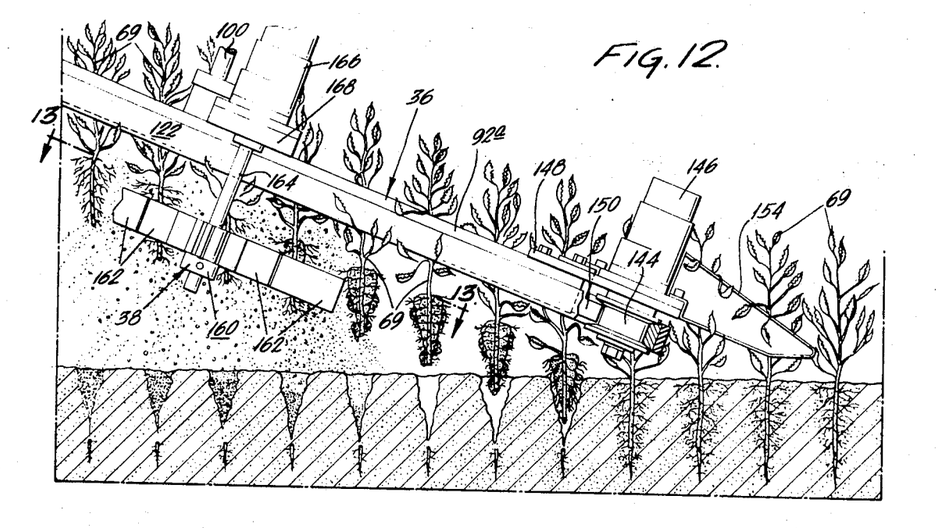
FIG. 12 is a side elevational view of the front portion of one of the plant conveyor assemblies isolated for clarity and showing the manner in which the plants are lifted from the ground and the soil removed from the roots thereof.

Before the machine is started forward to simultaneously harvest five rows of plants, the workers place empty cartons on the conveyors 186 over the ends of each conveyor assembly in the manner shown in FIG. 7. With the pumps 222 and 224 supplying pressurized fluid to continuously operate the conveyor motors 146 and the beater motors 166, the vehicle is started forward and maintained by a suitable governor at a predetermined rate of forward speed, preferably about two miles per hour. The valve 230 is then carefully adjusted to insure that the conveyor speed will be commensurate with the forward speed of the vehicle. In this manner the plants will be lifted by the conveyor directly upwardly rather than pulled rearwardly or dragged forwardly. The soft sponge rubber portions 126 of the conveyor belts 122 exert a gentle but firm grip on the plant stems, conveying the plants in single file fashion past the rotating beater vanes 164 as most clearly illustrated in FIGS. 12 and 13. The repeated engagement of the resilient beater vanes with the plant root structure will cause any residual soil on the roots to fragment and drop to the ground. The vanes 164 must be extremely resilient to avoid damage to the plant roots and in a preferred embodiment are made of a neoprene belting material.

When the plants reach the discharge end of a conveyor assembly, they pass into a carton 39 disposed over the conveyor assembly end. The succession of plants from the conveyor start to fill the carton and as the carton is filled, move the carton rearwardly on the roller conveyor 186. The light weight of the cartons and the supple nature of the plants prevent damage to the plants during this packing process. The packing of plants in this manner insures a vertical parallel relation of the plants and a maximum utilization of the carton space.

When a given carton is filled, which condition can be noted both by looking through the apertures 184 and also by observing the rearward progress of the carton along the conveyor, the filled carton is removed manually from the conveyor and simultaneously the accumulator 41 is actuated by means of the control 234 located directly above the conveyor assembly. This causes the accumulator cylinders 178 in question to move the accumulator rods 170 into the position 180 shown in FIG. 9 whereupon the plants discharging from the conveyor will be held between the accumulator rods until an empty carton can be placed into position on the conveyor 186. As the empty carton is positioned around the extended accumulator, the accumulator control 234 is actuated to retract the accumulator rods. The carton is moved along the roll conveyor 186 as the accumulator rods are retracted, thereby retaining the upright parallel disposition of the plants which pass from the accumulator assembly into the carton.

Should a rock or other obstruction jam one of the conveyor assemblies, one of the operators on the platform 188 on noting the condition can release the obstruction by means of the handle 120 and the mechanism actuated thereby. Upon removal of the locking pin 121 of the affected conveyor assembly, the lever 116 may be moved in a counterclockwise direction which by actuation of the bell cranks 106 and 108 serves to move the conveyor frame member 92b away from the member 92a in a parallel manner, thus permitting a space to open up between the conveyor belts and permitting the obstruction to drop to the ground. The lever 116 is then rotated in a clockwise direction until the locking pin 121 can be inserted, marking the return of the mechanism to the normal conveying position.

Although the embodiment illustrated shows five conveyor assemblies thereby adapting the machine to harvest five rows of plants at a time, it will be obvious that the number of conveyor assemblies is a matter of choice and that a harvesting machine embodying the invention could have any desired number of conveyor assemblies, and even a single conveyor assembly. The number of rows of plants to be harvested at one time will obviously depend on a number of factors including the size of the plants, the spacing of the plant rows, and the feasible size of the harvesting machine.

Manifestly, changes and details of construction can be affected by those skilled in the art without departing from the spirit and scope of the invention.

We claim

1. Apparatus for mechanically harvesting plants and depositing the same in an upright parallel disposition in a container comprising means for loosening the soil around the roots of the plants and for cutting the roots at a predetermined depth, means for lifting the plants from the loosened soil, said means for lifting the plants comprising conveyor means having a forward end and a discharge end with the conveyor means conveying the plants from the forward end to the discharge end in an upright parallel disposition, means for removing the residual soil from the roots of the plants, and means to support a container in a position aligned with and surrounding the discharge end of said conveyor whereby said plants are delivered into and retained in said container in an upright parallel disposition.

2. Apparatus for mechanically harvesting plants comprising a vehicle adapted for movement across a field of plants, said vehicle including a frame spaced above the ground a distance sufficient to clear the plants, said vehicle being adapted to travel through parallel rows of plants in a direction parallel with said rows, means supported by said vehicle frame for loosening the soil around the plant roots and for cutting the roots at a predetermined depth, conveyor means for lifting the plants upwardly from the loosened soil, means associated with said conveyor means for removing residual soil from the roots of the plants, means for supporting a container in aligned surrounding relation to the discharge end of said conveyor means to permit the discharge of the plants into the container in an upright parallel disposition, said container supporting means permitting telescoping movement of the container with respect to the conveyor as the plants accumulate within the container.

3. The invention as claimed in claim 3 wherein said means for lifting the plants comprises a conveyor assembly including a pair of juxtaposed conveyor belts adapted to grip the plants therebetween, said conveyor assembly being supported by said frame at an angle to the ground, and means for selectively controlling the speed of said conveyor belts to correspond to the speed of said vehicle.

4. The invention as claimed in claim 3 including means for selectively adjusting the height of said conveyor assembly above the ground.

5. The invention as claimed in claim 3 including means for selectively separating said conveyor belts to clear obstructions therefrom.

6. The invention as claimed in claim 3 including means associated with the discharge end of said conveyor assembly selectively operable for accumulating plants delivered by said conveyor belts during the changing of the container. for rotating said wheel, said wheel being positioned to provide engagement of said wheel vanes with the plant roots as said plants pass along said conveyor assembly.

7. The invention as claimed in claim 3 wherein said means for removing residual soil from the plant roots comprises a rotary beater adjacent said conveyor assembly, said beater including a wheel having a plurality of elongated readily deformable resilient vanes, means for supporting and continuously rotating said wheel in the plane of movement of the roots of the plants passing along said conveyor assembly, said wheel being positioned to provide engagement of the outer ends of said wheel vanes with the plant roots as said plants pass along said conveyor assembly.

8. Apparatus for mechanically harvesting plants comprising a self-propelled vehicle having a frame assembly, means on said frame assembly adapted for selective engagement with the ground to loosen the soil around the roots of the plants and to cut the roots at a predetermined depth, a conveyor assembly on said frame for lifting the plants from the loosened soil, said conveyor assembly including a pair of juxtaposed conveyor belts adapted to grip the plants therebetween, means for selectively controlling the speed of said conveyor belts to correspond to the speed of said vehicle, means for removing the residual soil from the roots of the plants as they pass along said conveyor assembly, means for advancing the plants into a container at the discharge end of said conveyor assembly in an upright parallel disposition, and means associated with the discharge end of said conveyor assembly selectively operable for accumulating plants delivered by said conveyor belts during changing of the container.

9. The invention as claimed in claim 8 wherein said means for loosening the soil around the roots of the plants and for cutting the roots at a predetermined depth comprises a plurality of spear-like tool elements, and means for selectively adjusting the height of said tool elements.

10. The invention as claimed in claim 9 wherein said latter means comprises a tool bar mounted on said vehicle for supporting said tool elements, and hydraulic cylinder means for selectively raising and lowering said tool bar.

11. The invention as claimed in claim 9 wherein said tool elements and said conveyor assembly are so aligned that said tool elements pass between the plant rows and said conveyor assembly passes along the plant row to lift the plants therefrom as said vehicle progresses across a field.

12. The invention as claimed in claim 8 wherein said vehicle includes a trailer draw bar extending rearwardly therefrom, and a hydraulic cylinder connected with said draw bar for selectively varying the rearward extent of said draw bar.

13. The invention as claimed in claim 8 wherein said conveyor assembly comprises a pair of elongated spaced parallel conveyor frame members, a drive sheave journalled at one end of each of said frame members and idler sheave journalled at the opposite end of each of said frame members, one of said conveyor belts passing around said drive sheave and said idler sheave of each frame member, the outer surface of said conveyor belts comprising a soft resilient sponge-rubber-like material, said means for selectively controlling the speed of said conveyor belts comprising motors adapted to rotate said drive sheaves at a uniform speed.

14. The invention as claimed in claim 13 including means on each said conveyor frame member for tensioning the conveyor belt carried thereby.

15. The invention claimed in claim 13 including means for selectively separating said conveyor frame members and hence said conveyor belts to free obstructions caught therebetween.

16. The invention as claimed in claim 13 wherein said means for accumulating plants comprises an accumulator rod slidably disposed beneath each conveyor frame member adjacent the discharge end of the conveyor, and means selectively operable for simultaneously extending the accumulator rods of the frame members beyond the discharge end of the conveyor assembly in parallel spaced relation for accumulating the plants therebetween.

17. The invention as claimed in claim 13 wherein said means for removing residual soil from the plant roots comprises a rotary beater adjacent said conveyor assembly, said beater including a wheel having a plurality of resilient vanes, means for rotating said wheels, said wheels being positioned to provide engagement of said wheel vanes with the plant roots as said plants pass along said conveyor assembly.

18. The invention as claimed in claim 17 including a beater adjacent each side of the conveyed plants, the resilient vanes of said beaters extending in overlapping relation, and means for rotating said beaters in the same direction whereby the overlapping vanes thereof engage the plant roots from opposite directions.

19. A plant conveyor assembly for a plant harvesting machine comprising a pair of elongated spaced parallel conveyor frame members, a drive sheave journalled at one end of each of said frame members, an idler sheave journalled at the opposite end of each of said frame members, a conveyor belt on each said frame members passing around the drive sheave and idler sheave thereof, the outer faces of said conveyor belt being in juxtaposed relation between said conveyor frame members, the outer surface of said conveyor belts comprising a soft resilient sponge rubber-like material, means for rotating said drive sheaves at a uniform speed to effect a uniform travel of the juxtaposed conveyor belts, means adjacent a discharge end of said conveyor assembly for supporting a shipping carton into which the plants are discharged from the conveyor, and means on said conveyor assembly selectively operable for accumulating plants delivered by said conveyor belts during the changing of the carton.

20. The invention as claimed in claim 19 wherein said means for accumulating plants comprises an accumulator rod slidably disposed beneath each conveyor frame member adjacent the discharge end of the conveyor, and means selectively operable for simultaneously extending the accumulator rods of the frame members beyond the discharge end of the conveyor assembly in parallel spaced relation for accumulating the plants therebetween.

21. The invention as claimed in claim 20 wherein said means for extending each said accumulator rod comprises a hydraulic cylinder on each said frame member, and control means for said hydraulic cylinders positioned adjacent the discharge end of said conveyor assembly.

22. Apparatus for mechanically harvesting plants comprising means for loosening the soil around the roots of the plants and for cutting the roots at a predetermined depth, conveyor means for lifting the plants upwardly from the loosened soil, means associated with said conveyor means for removing the residual soil from the roots of the plants, means for supporting a container in aligned surrounding relation to the discharge end of said conveyor means to permit the discharge of the plants into the container in an upright parallel disposition, and said container supporting means permitting telescoping movement of the container with respect to the conveyor as the plants accumulate within the container.

23. The invention as claimed in claim 22 wherein said means for removing the residual soil from the roots of the plants comprises a rotary beater adjacent said conveyor means, said beater including a wheel having a plurality of elongated readily deformable resilient vanes, means for supporting and continuously rotating said wheel in the plane of movement of the roots of the plants passing along said conveyor means, said wheel being positioned to provide engagement of said wheel vanes with the plant roots as said plants pass along said conveyor assembly.

* * * * *

UNITED STATES PATENT OFFICE
CERTIFICATE OF CORRECTION

Patent No. 3,743,024    Dated July 3, 1973

Inventor(s) William Harold Mayo, Arthur Burnett Winters, James Bradley Davis, Jr. and Campbell Soup Company It is certified that error appears in the above-identified patent and that said Letters Patent are hereby corrected as shown below:

Claim 3, line 1, change "3" to --2--.

Signed and sealed this 5th day of March 1974.

(SEAL)
Attest:

EDWARD M. FLETCHER, JR.
Attesting Officer

C. MARSHALL DANN
Commissioner of Patents